United States Patent [19]

Kinoshita

[11] Patent Number: 4,790,000
[45] Date of Patent: Dec. 6, 1988

[54] PORTABLE RADIO TELEPHONE SYSTEM
[75] Inventor: Yasuaki Kinoshita, Hachioji, Japan
[73] Assignee: Hitachi, Ltd., Tokyo, Japan
[21] Appl. No.: 940,489
[22] Filed: Dec. 10, 1986
[30] Foreign Application Priority Data Dec. 11, 1985 [JP] Japan ................................ 60-276749

[51] Int. Cl.[4] .............................................. H01N 11/00
[52] U.S. Cl. .......................................... 379/59; 379/61
[58] Field of Search ...................... 379/61, 59, 60, 57, 379/62, 63, 58; 455/33, 56, 54, 58

[56] References Cited

U.S. PATENT DOCUMENTS

| 3,955,140 | 4/1976 | Stephens et al. | 455/58 |
| 4,539,706 | 9/1985 | Mears et al. | 455/11 |
| 4,659,878 | 4/1987 | Dinkins | 379/61 X |
| 4,661,972 | 4/1987 | Kai | 379/57 |
| 4,672,658 | 6/1987 | Kavehrad et al. | 379/61 |

FOREIGN PATENT DOCUMENTS

| 204640 | 11/1983 | Japan | 379/58 |
| 59-27636 | 2/1984 | Japan | 379/63 |
| 236335 | 11/1985 | Japan | 379/58 |
| 86/6915 | 11/1986 | PCT Int'l Appl. | 379/61 |
| 2162404 | 1/1986 | United Kingdom | 379/59 |

OTHER PUBLICATIONS

Millicom, "Cellular Portable Telephone", Advertising Lit., received No. 21, 84.
Stocker, "Small Cell Mobile Phone Systems", I.E.E.E. Transactions on Vehicular Technology, vol. VT-33, No. 4, 11/84, pp. 269-275.

Primary Examiner—Robert Lev
Attorney, Agent, or Firm—Antonelli, Terry & Wands

[57] ABSTRACT

In order to make it possible to communicate between a portable radio telephone set through an existing public cellular radio telephone system and a private radio telephone system disposed inside the cells of the public cellular radio telephone system, an antenna and a transceiver for connecting the antenna to the private radio telephone system are disposed in each cell, and the transmitting power from the antenna and the transmitting power from the portable telephone set are set so that they do not impart interference waves to the public cellular radio telephone system.

4 Claims, 6 Drawing Sheets

| NORTH AMERICA | | JAPAN | |
|---|---|---|---|
| LEVEL NO. | POWER | LEVEL NO. | POWER |
| 0 | 0.6 W | | |
| 1 | 0.6 W | 0 | 1 W |
| 2 | 0.6 W | 1 | 160 mW |
| 3 | 250 mW | | |
| 4 | 100 mW | | |
| 5 | 40 mW | 2 | 25 mW |
| 6 | 16 mW | 3 | 5 mW |
| 7 | 6 mW | | |
| 8 | 2.5 mW | 4 | 1 mW |
| 9 | 1 mW | | |

PORTABLE RADIO TELEPHONE SYSTEM

BACKGROUND OF THE INVENTION

1. Field of the Invention

This invention relates generally to a portable radio telephone system. More particularly, the present invention relates to a private radio telephone system, for use in a local area, such as in an office building or in a factory and of the type wherein, when the portable telephone set is taken out from the area, it can communicate with subscribers of a public telephone network through a public cellular radio telephone system which has already been placed in service in certain urban areas.

2. Description of the Prior Art

A public cellular ratio telephone system has been known in the past as a urban cellular radio telephone system. When its portable telephone set is brought into an office building orina factory and is used to communicate with a subscriber of the private branch exchange for communication, not only the quality of telephone voice drops due to radio wave propagation attenuation by the office building, but also the telephone charge of the urban cellular telephone system must be paid.

As one example of urban cellular ratio telephone systems which improve the radio wave propagation attenuation of this kind, reference is made to the Proceedings of IEEE-VT Conference, 1984, pp 162.

In the portable telephone system described in the publication described above, introduction of a private branch exchange which has radio telephone subscriber circuits is not taken into consideration, so that direct communication cannot be made from the portable telephone set to the subscribers of the private branch telephone system.

On the other hand, if we introduce private branch radio telephone systems that have been commonly considered, the portable telephone set becomes expensive because it must have a radio frequency circuit of the private radio frequency channels in addition to the radio frequency of the urban cellular radio telephone.

SUMMARY OF THE INVENTION

The object of the present invention is to provide a portable radio telephone system wherein a portable telephone set can be used both for an urban public cellular radio telephone system and for a private radio telephone system which is built inside a local area. For example, the present invention is directed to provision of a portable radio telephone system wherein direct access can be made from a portable telephone set to the ratio frequency circuit of a private branch exchange without causing any radio wave interference to a heretofore known urban cellular radio telephone system.

To realize the present invention, there is a portable radio telephone system of the type wherein a given area is divided into a plurality of large areas, each of the large areas is further divided into a plurality of small cellular areas, and wherein the reuse of the same frequency channel is permitted between the large areas, while different frequency channels are allocated to the small cellular areas of each large area and public radio communication is effected by portable telephone sets by use of the radio waves of the frequency channels allocated to the small cellular areas. The object of the present invention described above can be accomplished by a private radio telephone system consisting of an antenna for transmitting and receiving a radio wave frequency pair which reuses the same frequency channel pair as the public cellular radio telephone system, but does not use the frequency channels allocated to the small cellular area in which the private telephone system exists. The system includes a private branch exchange and a transceiver, both of which are connected to the antenna, and private radio communication is made through the private branch exchange by use of the portable telephone sets.

Incidently, the power intensity of the radio wave radiated from the antenna is kept to a very low intensity level so that it does not affect the public cellular radio telephone system in the large areas, and also the frequency channel pair is selected so that it does not interfere with the public cellular radio telephone system of the large areas. To prevent the occurrence of wave interference, the antenna described above may have directivity.

When the portable radio telephone system of the present invention is disposed in a district where the density of subscribers of a public cellular radio telephone system is high, the radius of the small cellular area (cell or sector) becomes small so that the service area of a local private system using a single antenna becomes narrow. In such a case, the local area is divided into a plurality of mini cells with each antenna and radio waves of different frequency channel pairs being reused among the mini cells to secure a required service area, as described, for example, in "Personal Communication", September, 1985, pp. 28.

The above and other objects and also novel features of the present invention will become more apparent from the following description when taken in conjunction with the accompanying drawings.

DESCRIPTION OF THE PREFERRED EMBODIMENT

Figure 1:
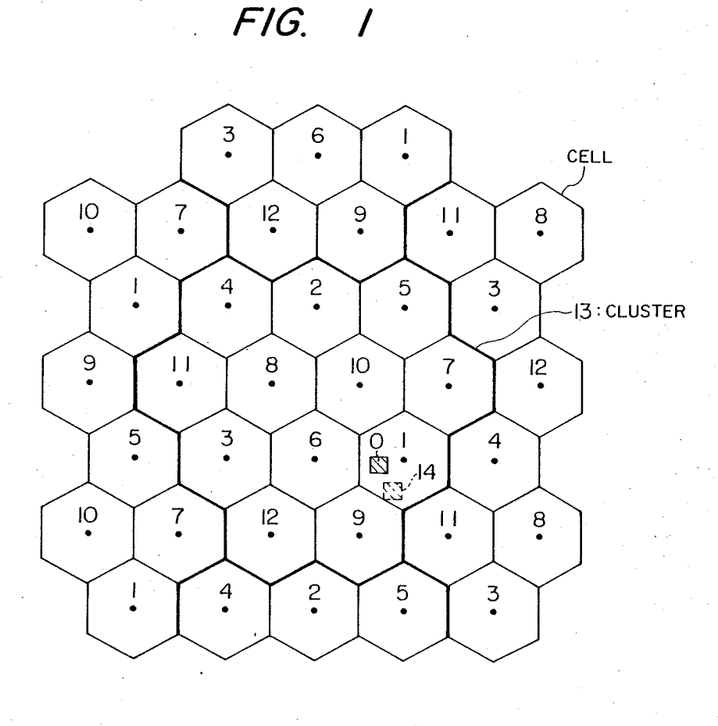
FIGS. 1, 4, 6 and 7 show examples of cell disposition of a urban cellular radio telephone system of the present invention.

FIG. 1 shows an example of cell disposition of a heretofore known public cellular radio telephone system in order to have the present invention more easily understood.

A given area is divided into a plurality of large areas (which are referred to as a "cluster") represented by a thick line and each of the clusters is divided into twelve cells (small areas) 1-12. An antenna for transmission and reception (represented by black dot ".") is disposed at the center of each cell.

Radio frequency channels are allocated to each cell in a number corresponding to the traffic of the radio telephone. These radio waves will be called "$f_1$" in the cell 1, "$f_2$" in the cell 2, "$f_3$" in the cell 3, and so forth. The $f_1, f_2, \ldots$ radio waves have an allocated bandwidth, and a plurality of frequency channels exist in each bandwidth related to the radio telephone traffic. Additionally, the position of the cell 1 in the cluster 13 is selected so that the intensity of the $f_1$ wave interference from outside the cluster becomes minimal.

In the portable radio telephone system of the present invention, radio communication may be carried out between a private branch radio telephone system in one cell and a portable telephone set by use of frequencies different from the frequencies allocated to the cell.

Incidentally, the frequency and intensity of the radio waves used for the private branch radio telephone system are selected in the following manner to prevent radio wave interference from occurring with the other cells in the cluster. Namely, the frequency channels allocated to the cell 1 must be the channels which are used in cell most distant from the cell 1. Thus, the $f_2$ wave of the cell 2 exists for the cell 1. The cell 4 is the most remote from the cell 1 inside the cluster 13, but the interference intensity of the $f_4$ wave from outside the cluster 13 is greater than that of the $f_2$ wave. The $f_3$ wave used in the cell 3 also satisfies the condition described above.

Figure 2:
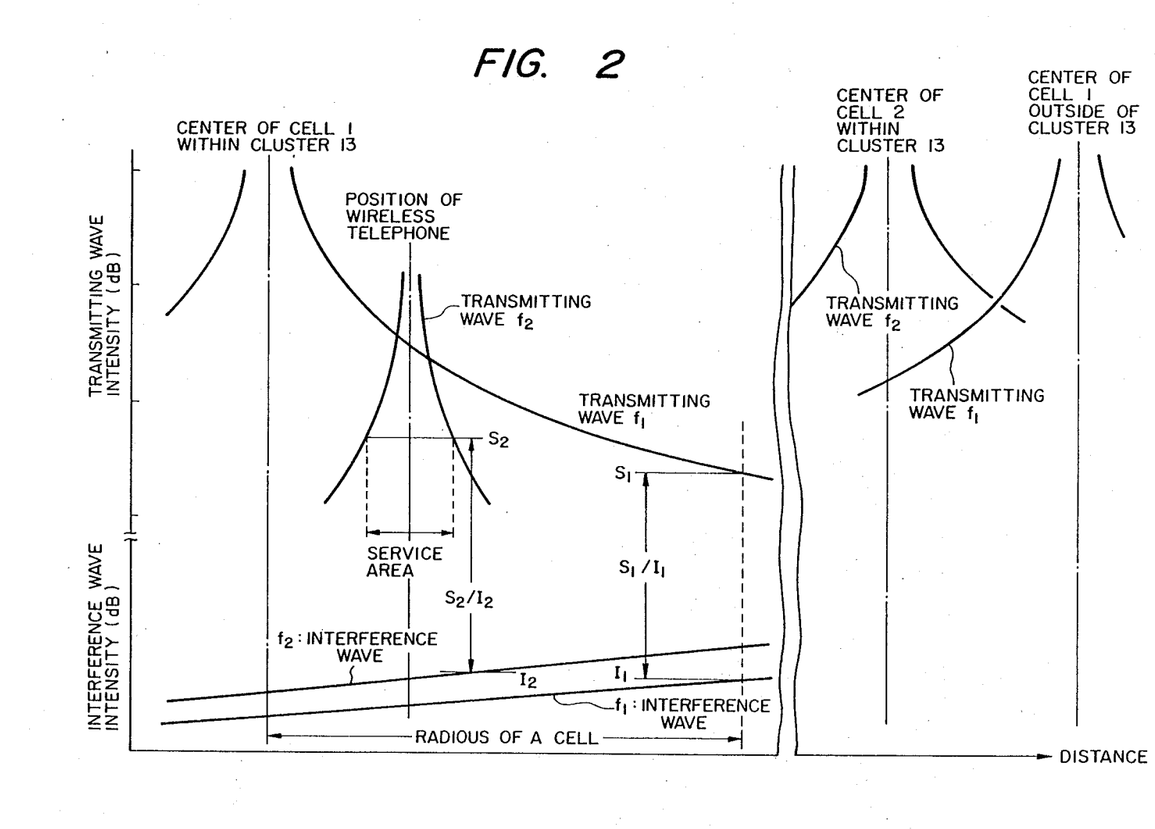
FIG. 2 is an explanatory view of the intensity of a radio wave in an embodiment of the present invention.

FIG. 2 shows the intensity of the radio wave used by the portable radio telephone system of the present invention. In other words, when the private radio telephone system 0 of the present invention is disposed inside the cell 1 as is shown in FIG. 1, the electric field intensity $E_1$ of the radio wave radiated from the cell 1 can be expressed by the following equation if irregular radio wave propagation does not exist:

$$E_1 = \underline{a}\sqrt{P_1}/R \qquad (1)$$

where R is the distance from a transmitting antenna to a reception antenna, a is a proportional coefficient and $P_1$ is the transmitting power of the antenna.

In the public cellular radio telephone system, the radius of the cell is determined at a boundary where the ratio $S_1/I_1$ of the intensity $S_1$ of the received $f_1$ wave to the intensity $I_1$ of the $f_1$ wave interference from outside the cluster 13, so that the the quality of telephone voice is kept at a predetermined level.

The transmitting power $P_2$ of the private radio telephone system 0 of the present invention is kept to a value at which the ratio of the intensity $S_2$ of the transmitting $f_2$ wave to the intensity $I_2$ of the $f_2$ wave interference at the boundary of the local service area satisfies the conditions below:

$$\left. \begin{array}{l} S_2/I_2 = S_1/I_1 \\ P_2 \text{ is below the upper limit value that} \\ \text{does not interfere the other private} \\ \text{radio telephone systems adjacent thereto.} \end{array} \right\} \qquad (2)$$

Figure 3:
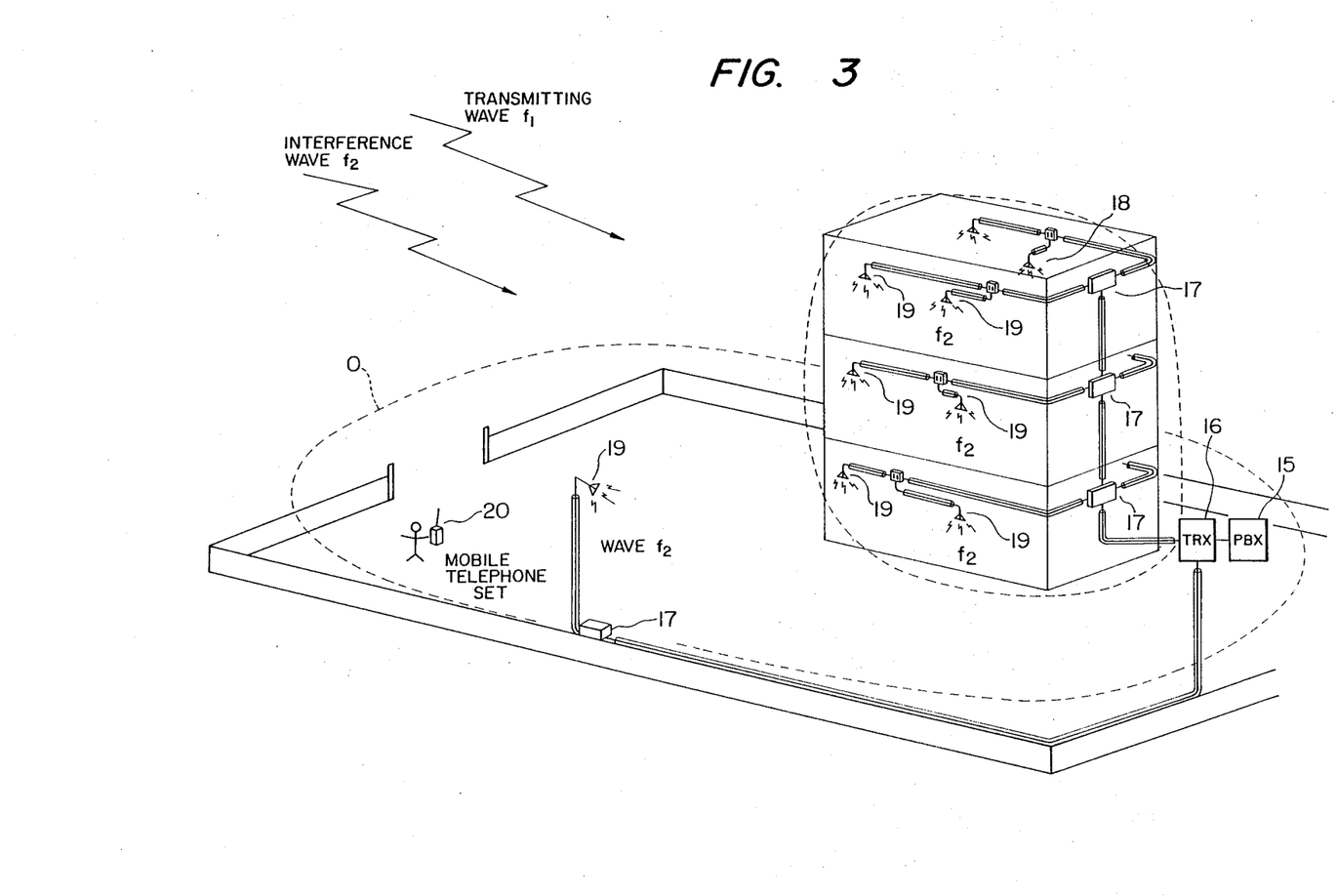
FIGS. 3 and 5 are schematic views showing the construction of the portable radio telephone system of the present invention.

FIG. 3 is a structural view of the portable radio telephone system in accordance with one embodiment of the present invention. A private branch exchange (PBX) 15 for wired telephone subscribers is disposed in the private radio telephone system 0 (corresponding to 0 in FIG. 1) and radio telephone subscriber circuits are added thereto. The radio telephone subscriber circuits are connected to transmission/reception antennas 18, 19 through transceivers (TRX) 16 and a booster 17, and the $f_2$ wave having the intensity that can suppress the $f_2$ wave interference of the public cellular radio telephone system, is transmitted from the antennas and enables the portable telephone set 20 to communicate by receiving the $f_2$ wave from the antennas.

As will be described elsewhere, the portable telephone set 20 can communicate with the $f_1$ wave from the cell 1 of the public cellular radio telephone system. The transmitting power of the portable telephone set 20 is also determined to a value that satisfies the condition of eq. (2). This controlling is effected automatically by a radio frequency controller disposed inside the the private branch exchange (PBX) 15. The method of controlling the transmission power for the private radio telephone system is the same as the method used for the heretofore known public cellular radio telephone system.

Figure 4:
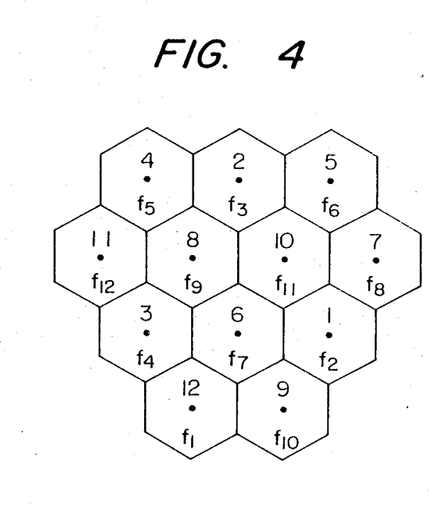

FIG. 4 shows the relation of the $f_N$ wave ($N = 1 \sim 12$) of the radio frequency channel with FIG. 1 when the private radio telephone system is disposed for each of the cells inside the cluster 13. For example, the cells 4, 2, 5 in FIG. 1 use the $f_5$, $f_3$ and $f_6$ waves, respectively.

When a plurality of private radio telephone systems are disposed for each of the cells inside one cluster, the total interference intensity must be maintained below a predetermined level. However, the condition which prevents the interference to the nearest adjacent system in accordance with the present invention is far more severe. As the radiation from an outdoor antenna shown in FIG. 3 is particularly severe, the interference is restricted by providing the antenna with directivity.

Furthermore, when a plurality of private radio telephone systems exist extremely close to one another inside the small cell, the service area of the private radio telephone system of the present invention becomes extremely narrow in order to prevent their mutual interference. To solve this problem, other radio frequency channels (e.g. alternate use of $f_2$ and $f_3$ waves in the cell 1) are used for the adjacent private branch telephone systems.

Figure 5:
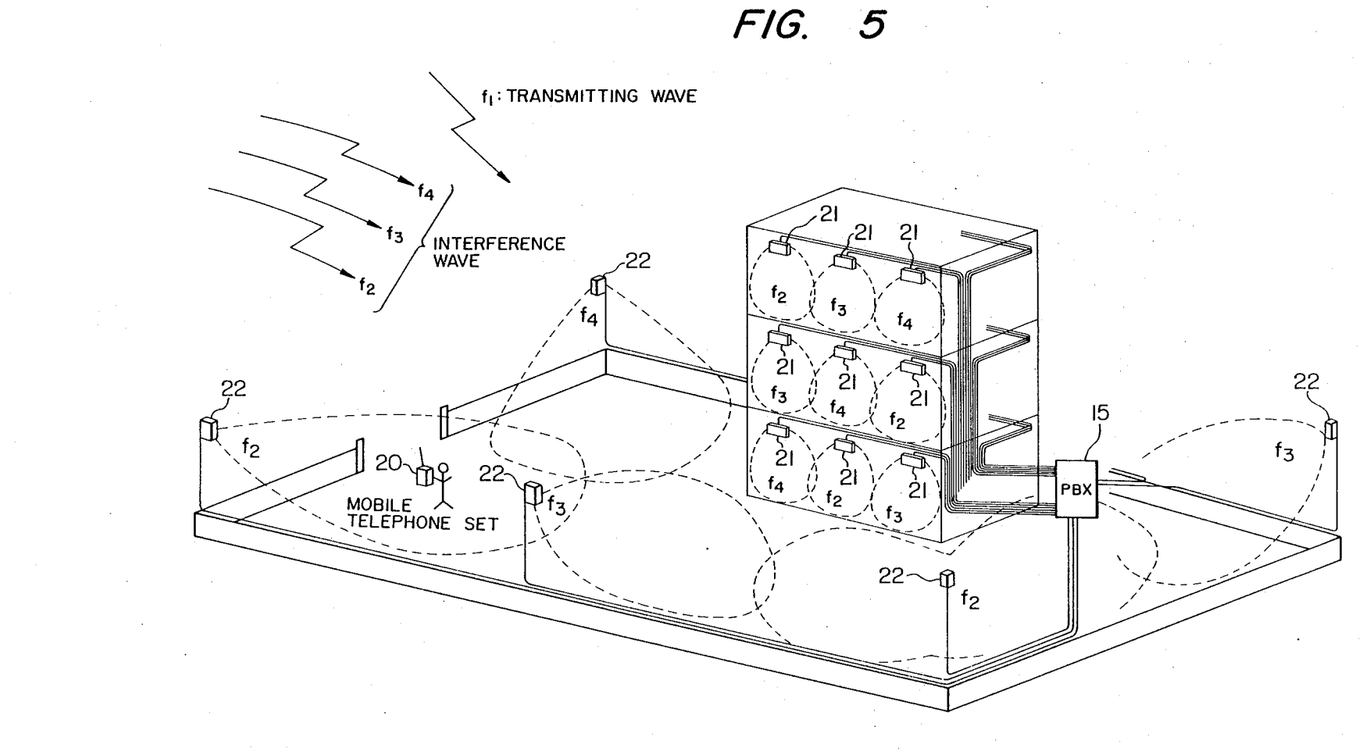

FIG. 5 shows the construction of the portable radio telephone system in accordance with another embodiment of the present invention. In this embodiment, a plurality of radio frequency channels are reused in one local area.

A transceiver (TRX) 21 having a radio wave transceiver and an antenna is disposed inside a building while a transceiver (TRX) 22 is disposed outside the building, and the radio frequency channels, the transmission power and the antenna directivity are selected so that they do not interfere with each other. The private branch exchange (PBX) 15 is equipped with a radio frequency controller, and when the portable telephone set 20 moves from the $f_2$ area to the area of $f_3$, the controller detects automatically the movement and switches the channels in the same way as the public cellular radio telephone system. If the radio frequency controller selects the empty channel(s) of both the public cellular radio telephone system and the other private radio telephone systems inside the cluster, the quality of the telephone voice is highly improved.

The district in which the portable radio telephone system of the present invention is disposed is not restricted to the cell disposition shown in FIG. 1.

Figure 6:
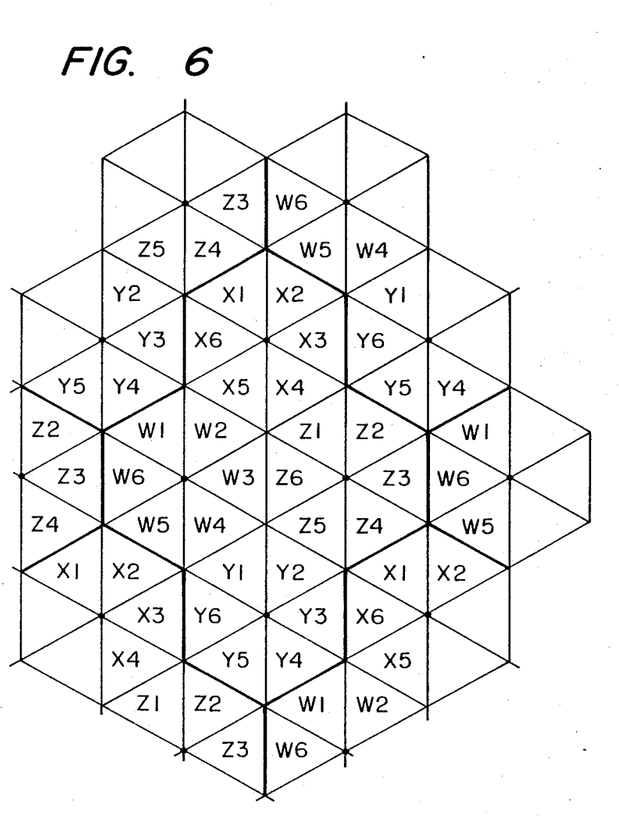
Figure 7:
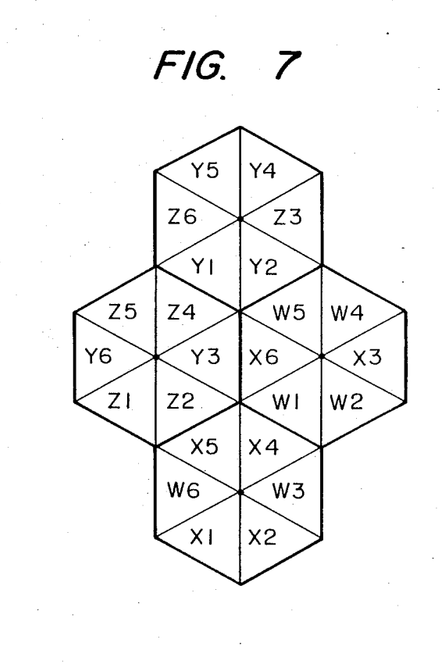

FIGS. 6 and 7 show an example of sector cell allotment. Each cell is divided into six sectors and four cells = 24 sectors form a unit cluster. A multibeam antenna having 60° directivity is disposed at the center of the hexagonal cell. The frequency channel of each sector is reused among the clusters where a public cellular radio telephone system is in service. FIG. 7 shows the sector number of the frequency channel corresponding to FIG. 6 when the private radio telephone system of the present invention is disposed inside each sector, and the system doubly reuses the radio frequency channel inside the sector. Other examples of sector numbers of the frequency channels can of course exist in the same way as the case of 12-cell unit sectors in FIG. 1. When the wave interference is taken into consideration for sector cells, the directivity of the antenna becomes an important factor, and the gain function $G(\theta)$ must be introduced in the proportional coefficient $\underline{a} = a_0 G(\theta)$ of eq. (1).

In a district where the number of subscribers of the public cellular radio telephone system becomes large, the traffic per unit area is increased by reducing the radius of the cell. The portable radio telephone system of the present invention is designed in consideration of this increase inside the respective area. Table 1 illustrates the radius of the service area of the private radio telephone system and the radius of the cell of the public cellular radio telephone system.

TABLE 1

Transmission power of antenna (19) of personal mobile telephone system of this invention and service area

| | | | | |
|---|---|---|---|---|
| A cell radius | 5 km | 3 km | 1.5 km | |
| transmission power | 25 W | 9 W | 2.5 W | |
| B service area radius | 500 m | 300 m | 150 m | 50 m |
| transmission power | 250 mW | 90 mW | 25 mW | 2.5 mW |

Note: Sensitivity of reception system is assumed equal to that of public system.

If a large number of mini cells must be disposed inside the local area, a plurality of radio frequency channels also must be reused in the private radio telephone system. In this case, the radius of the mini cell becomes much smaller than the maximum radius of the service area shown in Table 1.

In the actual cases, the shape of the cell is not so ideal as the ideal cell disposition shown in FIGS. 1 and 6, and the power of the transmitted radio wave attenuates more rapidly than eq. (1). However, the application of the present invention is not essentially changed by these factors.

Figure 8:
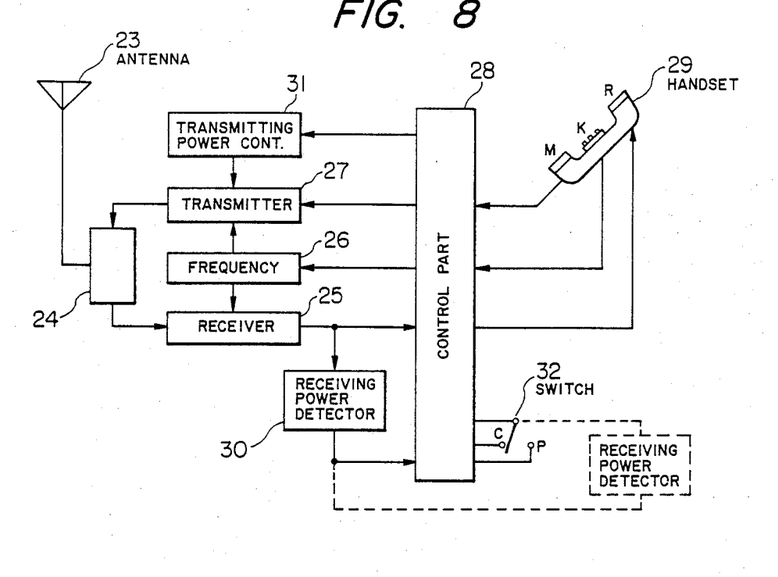
FIG. 8 is a block diagram showing the construction of a portable telephone set used for the portable radio telephone system in one embodiment of the present invention.

FIG. 8 shows the construction of a telephone set used in the portable telephone system described above.

In the drawing, reference numeral 23 represents an antenna connected to an antenna distributor 24 for sending the reception signal from the antenna 23 to a receiver 25 and applying a transmission signal from the transmitter 25 to the antenna 23. Numeral 26 represents frequency synthesizer for operating the transmitter 27 and the receiver 25 on predetermined channels. A control part 28 receives, as its input signals, the reception signal from the receiver 25, a reception level signal of the reception signal by a reception signal level detector 30 and signals from a handset 29 having a microphone M, a speaker R and a key pad K, and supplies predetermined signals to the transmitter 27, a transmitting power controller 31 and the frequency synthesizer 26.

Since the construction of the portable telephone set is substantially the same as the construction of a mobile telephone set used in the heretofore known urban mobile telephone system (such as the telephone set described in "The Bell System Technical Journal", Vol. 58, No. 1, pp. 123), its detailed description is hereby omitted.

The first characterizing feature of this embodiment lies in that a small output level, which is used for the private radio telephone system, is set to the output power controller 31 of the portable telephone set so that it can be used commonly for both the public cellular radio telephone system and the private radio telephone system. This is because the reception sensitivity of the local base station can be made substantially equal to that of the large area cellular radio telephone system and the distance between the portable telephone set and the station is small.

Figure 9:
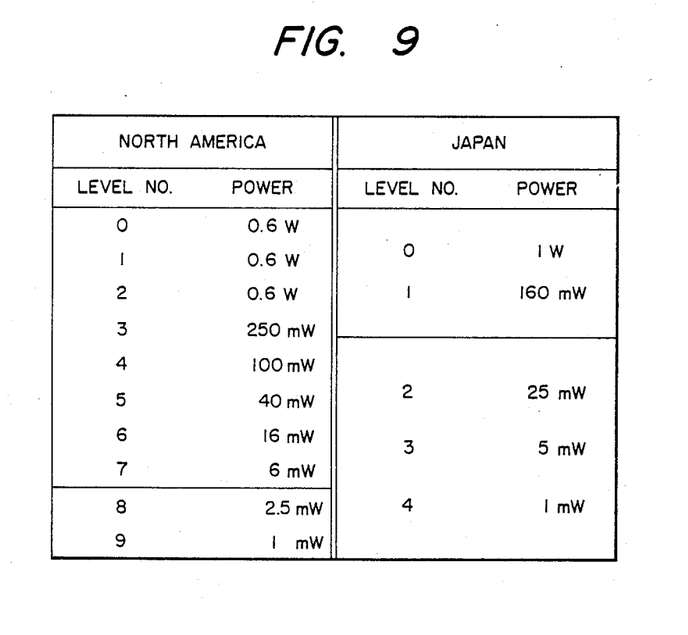
FIG. 9 shows the output power levels at which the portable telephone set of FIG. 8 operates.

FIG. 9 shows the levels of the output power that can be accepted by the output power controller 31 for North America and Japan. In the case of the public cellular radio telephone system of North America, the minimum power is stipulated to 6 mW of the level 7, but 2.5 mW of the level 8 and 1 mW of the level 9 are further added in order to use it for the system of the present invention. In the case of the public cellular radio telephone system of Japan, the minimum power level is 160 mW of the step 1, but 25 mW, 5 mW and 1 mW of the levels 2, 3 and 4 are further added for the system of the present invention.

In other words, the portable telephone set of FIG. 8 has a switch portion for the power levels necessary for communication in the cells (1–12) shown in FIG. 1 and the communication power levels necessary for the private radio telephone system (e.g. 0, 14) inside the cell (1) described above.

The second characterizing feature of the portable telephone set shown in FIG. 8 lies in that it has switch means for changing over the modes of use as desired by an operator to a mode where communication can be made by utilizing the private radio telephone system when the telephone set enters the local service area of the private radio telephone system.

When the mode switch 32 is manually changed from the contact P to C, the frequency channel of the frequency synthesizer 26 and the level range of the transmitting power controller 31 are forcedly set to the state where the control signal of the private ratio telephone system can be received. In other words, the switch 32 selects the combination of the frequency channels of the communication system of the cells (1–12) of FIG. 1 with the power levels and the frequency channels of the private radio telephone system (e.g. 0, 14 in FIG. 1) with the transmitting power levels.

This mode switch 32 may be of an automatic type. Namely, it may include a reception level judging detector 33 represented by dash line in FIG. 8. In the public cellular radio telephone system, when the telephone set is under the waiting state where it receives the control signal from its station, it receives the time slot for calling other subscribers most of the time. This waste time is utilized in order to receive the control signal in the private radio telephone system and when the reception intensity is at a sufficiently high level, the mode switch can be changed over automatically.

As described above, the present invention provides the following effects.

(1) In accordance with the present invention, the radio frequency channels used in the existing public cellular radio frequency system are reused in a private radio telephone system. Accordingly, the use of new frequency resources is not necessary.

(2) In accordance with the present invention, when the portable telephone set is brought into an area where the public cellular radio telephone system is in service, direct access can be made from the telephone set. Accordingly, radio wave attenuation due to buildings or the like does not occur and the toll for the public cellular radio telephone system is not necessary.

(3) In accordance with the present invention, the mobile telephone set that can make direct access to both the public cellular radio telephone system and the private radio telephone system can be accomplished without increasing a radio frequency circuit at the portable telephone set. Therefore, the portable set can be made compact in size and simple in construction and can be produced economically.

What is claimed is:

1. In a portable radio telephone system for use in a given area which is divided into a plurality of large areas, each of said large areas being further divided into a plurality of small cellular areas, wherein the same radio frequency channels are repeated for each of said large areas, while respective ones of said radio frequency channels are allocated to said respective small cellular areas in each large area, a system for effecting radio communication by means of a portable radio telephone set by use of selected ones of said allocated frequency channels, comprising:

a plurality of antennas provided in a local area disposed inside one of said small cellular areas for transmitting and receiving radio waves;

a portable radio telephone set;

a private branch exchange disposed within said local area; and a transmission/reception circuit connecting said antennas to said private branch exchange;

wherein radio communication is carried out inside said local area by said portable radio telephone set by use of radio waves of one of said allocated frequency channels of a non-adjacent small cellular area which is different from the frequency channel allocated to the small cellular area in which said local area is disposed and the power of said radio waves used by said portable radio telephone set in said local area is larger than the power of radio waves of the same frequency radiated from small cellular areas other than said small cellular area in which said local area is disposed.

2. A portable radio telephone system according to claim 1, wherein said local area lies within a building structure.

3. A portable radio telephone system according to claim 2, wherein a plurality of antennas is disposed inside said building structure and frequency channels different from said frequency channels allocated to said small cellular area in which said local area is disposed are used for radio communication inside said building structure.

4. A portable radio telephone system according to claim 2, wherein said local area disposed in one of said small cellular areas consists of a plurality of mini areas, and said antennas are disposed in said mini areas adjacent to one another and transmit and receive radio waves of mutually different frequencies.

* * * * *